No. 712,637. Patented Nov. 4, 1902.
W. H. BEENK & H. REINHOLD.
ICE CHIPPING MACHINE.
(Application filed May 13, 1902.)
(No Model.)
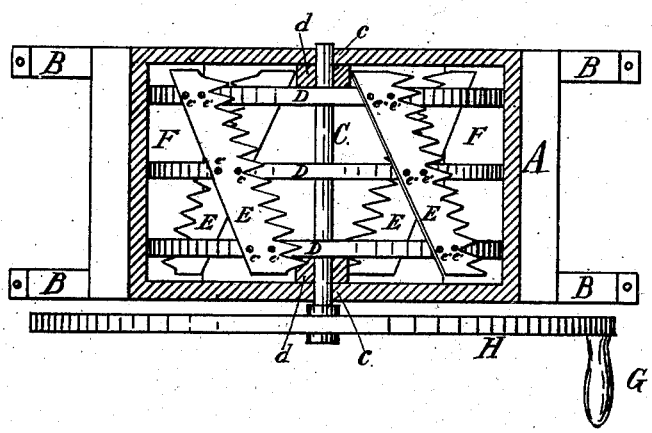
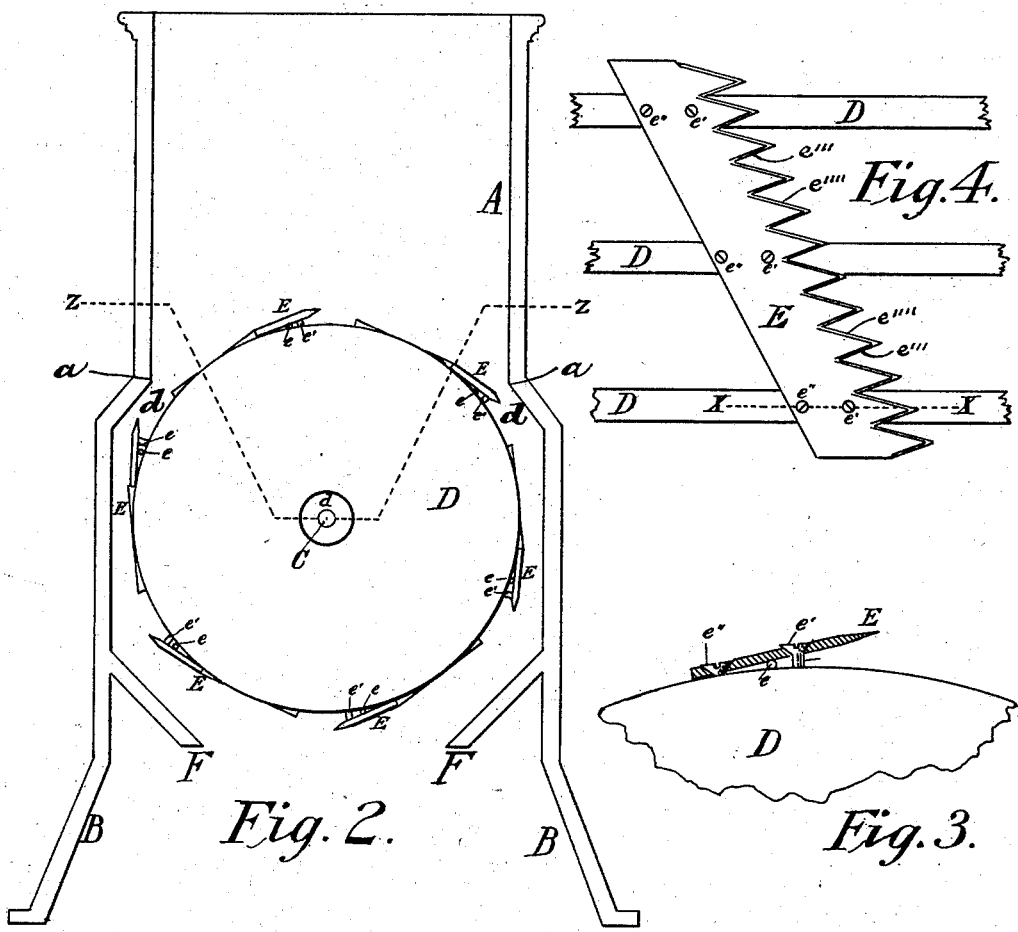
Witnesses.
Blanche Campbell
Joe Sherry
Inventors.
William H Beenk
Herman Reinhold
Ely Roush
Attorneys.

UNITED STATES PATENT OFFICE.

WILLIAM H. BEENK AND HERMAN REINHOLD, OF DAVENPORT, IOWA.

ICE-CHIPPING MACHINE.

SPECIFICATION forming part of Letters Patent No. 712,637, dated November 4, 1902.

Application filed May 13, 1902. Serial No. 107,177. (No model.)

*To all whom it may concern:*

Be it known that we, WILLIAM H. BEENK and HERMAN REINHOLD, citizens of the United States, and residents of Davenport, in the county of Scott and State of Iowa, have invented certain new and useful Improvements in Ice-Chipping Machines, of which the following is a specification.

Our invention is an improvement in those chipping-machines in which the ice is chipped by toothed blades fixed upon and rotating with wheels or disks providing hollow cylinders; and the objects of our invention are as follows: first, to provide a machine which may be attached to an ice-wagon or used independently and which is adapted to chip ice from the solid block into convenient sizes and shapes easily, rapidly, and in large quantities for use in saloons, ice-cream factories, and other places requiring large quantities of chipped ice as distinguished from shaved ice; second, to provide adjustable means for the toothed blades for chipping ice to any required degree of fineness.

In order that our invention may be fully understood, we will proceed to describe it with reference to the accompanying drawings, in which—

Figure 1 is a top or plan view of our improved ice-chipping machine, the casing and washers being in section on the lines $z\ z$ of Fig. 2. Fig. 2 is a side elevation of the machine as it appears when the driving-wheel and the side of the casing are omitted. Fig. 3 is a detail view of a wheel, showing the adjustable attachment of a chipping-blade, taken on the line $x\ x$ of Fig. 4. Fig. 4 is a detail view of the wheels, showing a chipping-blade secured thereto.

Similar letters refer to like parts throughout the several views.

The casing consists of an irregular-shaped box A, having a body open at the top and at the bottom and provided with legs B. The upper part of the casing is narrower than the body thereof, and the whole casing is made of wood or other suitable material.

C is a shaft journaled in the sides of the body at $c$.

Within the casing and rigidly fixed to the shaft C are a series of three blade-supporting wheels or disks D.

$d$ represents washers located on the shaft within the body adapted to keep the outer wheels at a proper distance from the sides of the casing, leaving spaces through which the chipped ice can fall as well as between the wheels. Adjustably mounted upon the peripheries of the wheels are chipping toothed blades E, each blade bridging the wheels and having its ends projecting beyond the outer wheels. The toothed blades are secured to the wheels, diagonally and tangentially thereof, so as to occupy positions semispiral to the shaft and at an angle to the circumference of the wheels. The chipping-blades E are each formed with a continuous series of acute angle-teeth, so as to present stepped rows thereof. Each tooth has one of its edges $e'''$ approximately at right angles to the line of points of said teeth, the other edges $e''''$ of the teeth extending from the points to the base of the adjoining teeth. The wheels are provided with peripheral bearings $e$, mounted upon or formed integral therewith, and against these bearings the toothed blades are secured by series of screws $e'$ and $e''$, extending through the toothed blades and into the substance of the wheels at the front and rear of the blades, respectively, on opposite sides of the peripheral bearings. The angle of the toothed blades E to the circumference of the wheels D is increased by loosening the front screws $e'$ and tightening the rear screws $e''$ and is reduced by loosening the rear screws $e''$ and tightening the front screws $e'$. The boards F are provided beneath the wheels to concentrate or direct the discharge of the chipped ice. The upper part of the casing provides a hopper and is made narrower than the body to prevent jumping of the ice from contact with the toothed blades and the clogging of the wheels by the thin points of ice extending between the wheels and the front and rear of the casing. By narrowing the upper part of the casing the block of ice, which may conform in size to the capacity of the hopper, is supported on the top of the wheels while being picked by the teeth and is chipped in steps. The enlargement of the body beneath the hopper provides a clearance-space $d$ at the front and rear between the tangentially-projecting teeth and the base of the hopper, which prevents clogging of the chipped ice, while angles or shoulders a are provided, against which the teeth are directed in chipping the ice.

The shaft C extends through one side of the casing, and its projecting end is constructed to receive a wheel H, provided with a handle G, by which the shaft can be rotated.

The blades E are so mounted that the teeth of one blade follow in the path of the indentations of the immediately preceding and following blades and the indentation of each travel in the path of the teeth of the immediately preceding and following blades.

The operation of the machine is as follows: The ice to be chipped is placed in the hopper or upper part of the frame and held by gravity against the wheels D and blades E, the wheel H being rotated in the direction in which the teeth point. The teeth are brought in contact with the ice and chip it rapidly and easily.

While this machine is primarily designed for use with large cakes or blocks of ice, it is manifest that it is adapted to be reduced in size and used for counters and all other uses requiring a finely-chipped ice. Where the machine is greatly enlarged, additional wheels D may be mounted upon the shaft C to assist in supporting the blades and to hold the ice until it is sufficiently reduced in size to allow it drop readily through the spaces between the blades.

It is obvious that this machine may be operated by a simple crank or by a belt applied to the wheel H or by gearing as well as by hand.

The principle of our invention is the application of rotating toothed blades in contact with blocks of ice, the blades being spirally or semispirally mounted upon the peripheries of the wheels bearing them and at an angle to the circumference of the wheels and alternating the paths of the teeth of the successive blades, and the best mode of applying that principle is by means of the construction herein described.

Having thus described our invention, the following is what we claim as new therein and desire to secure by Letters Patent—

1. An ice-chipping machine comprising a casing, a shaft journaled in the casing, wheels fixed to the shaft, at a distance apart, blades, each having a continuous series of acute-angle chipping-teeth and secured to the wheels so as to bridge the latter diagonally and tangentially thereof and presenting stepped spiral rows of teeth, and means for rotating the shaft.

2. An ice-chipping machine comprising a casing, a shaft journaled in the casing, wheels fixed to the shaft, blades secured to the wheels so as to bridge the latter diagonally and tangentially thereof; each blade having a continuous series of chipping-teeth, and each tooth having one of its edges approximately at right angles to the line of points of said teeth and the other edges of the teeth extending from the points to the base of the adjoining teeth, and means whereby the shaft is rotated.

3. An ice-chipping machine comprising a casing, a shaft journaled in the casing, wheels having peripheral bearings, and fixed to the shaft, blades secured to the wheels, rear and front screws extending through the blades on opposite sides of the bearings and into the substance of the wheels, and means for rotating the shaft.

4. An ice-chipping machine comprising a casing, a shaft journaled in the casing, wheels having peripheral bearings extending diagonally thereof, fixed to the shaft, blades, each having a continuous series of chipping-teeth and secured to the shaft so as to bridge the latter diagonally and tangentially thereof, rear and front screws extending through the blades on opposite sides of the bearings, and into the substance of the wheels, and means for rotating the shaft.

In witness whereof we have hereto respectively signed our names, in the presence of two witnesses, this 9th day of May, A. D. 1902.

WILLIAM H. BEENK.
HERMAN REINHOLD.

Witnesses:
BLANCHE CAMPBELL,
JOE SHOREY.